United States Patent [19]
May, III et al.

[11] Patent Number: 5,785,464
[45] Date of Patent: Jul. 28, 1998

[54] SMALL MATERIAL TRANSFER SYSTEM

[76] Inventors: Peter May, III; Daniel T. Harnish, both of 104 James St., Smithville, Mo. 64089

[21] Appl. No.: 657,957

[22] Filed: Jun. 4, 1996

Related U.S. Application Data

[60] Provisional application No. 60/000,165, Jun. 12, 1995.
[51] Int. Cl.⁶ .................................................. B65G 53/60
[52] U.S. Cl. .......................... 406/163; 406/21; 406/23; 406/171
[58] Field of Search ........................ 406/21, 23, 163, 406/171, 172

[56] References Cited

U.S. PATENT DOCUMENTS

| | | |
|---|---|---|
| 4,947,903 | 8/1990 | Beckwith ........................... 406/171 X |
| 5,252,008 | 10/1993 | May, III et al. ........................... 406/23 |

*Primary Examiner*—Andrew C. Pike
*Attorney, Agent, or Firm*—Wagner & Middlebrook

[57] ABSTRACT

A loading device primarily for injecting granular plastic material into molding or extrusion machines includes a tee chamber connected to a source of the material. A filter and screen are supported on a top plate interposed between the filter and the tee chamber. A baffle is located in the tee chamber to deflect the solid material to a sight glass assembly, while air and fines flow toward the screen and filter. A second or middle plate is inserted between the tee chamber and the sight glass assembly. A bottom plate supports the sight glass and is part of an end bell which includes a quick connect and disconnect sleeve for attachment to the associated machine. A plurality of support rods and threaded members secure the top plate to the middle or second plate, and the middle or second plate to the bottom plate. A level sensor is secured to a bracket fastened to two support rods such that the level sensor senses the level of material in the sight glass and controls a source of air carrying the material to the loading device.

17 Claims, 3 Drawing Sheets

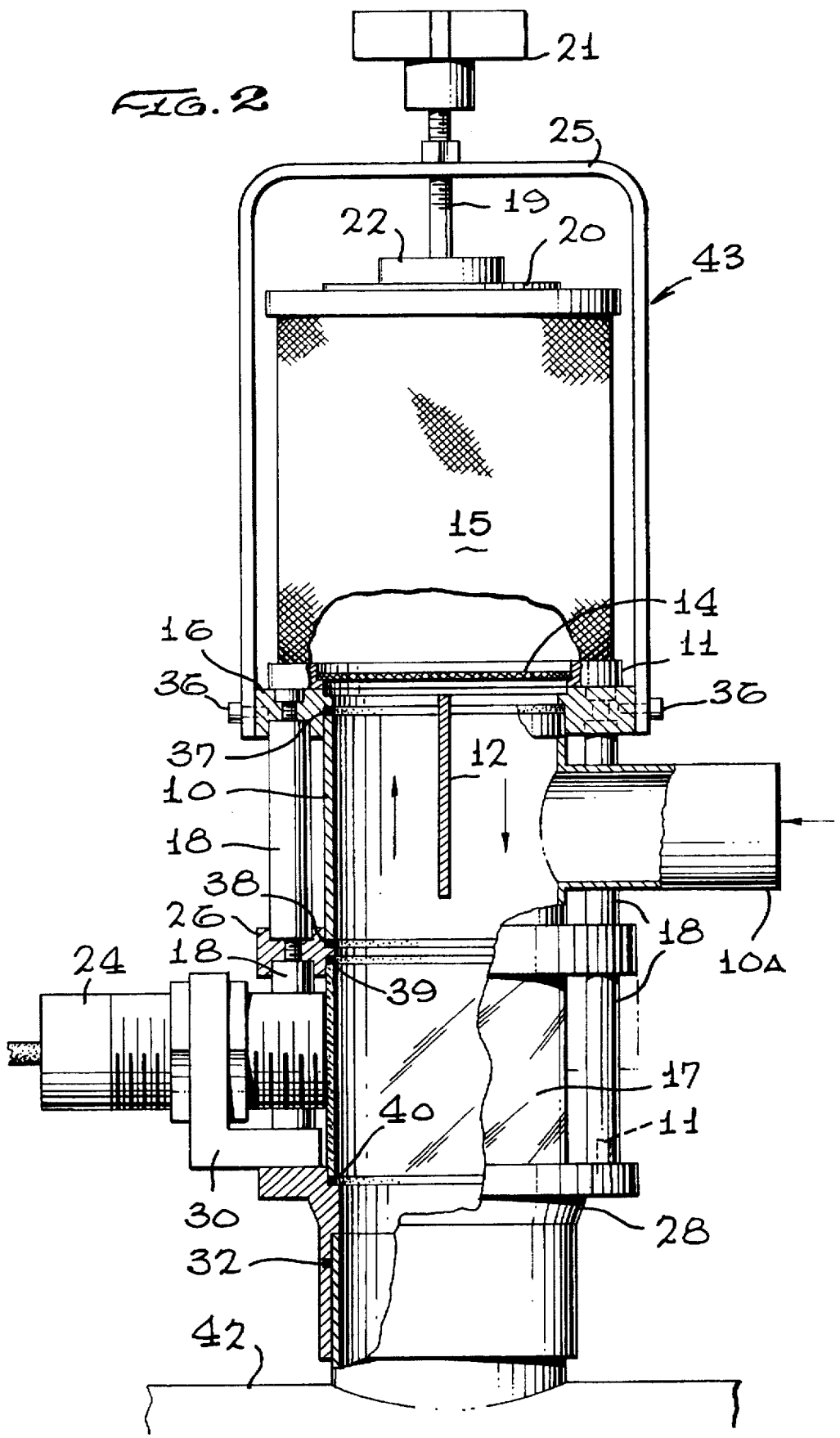

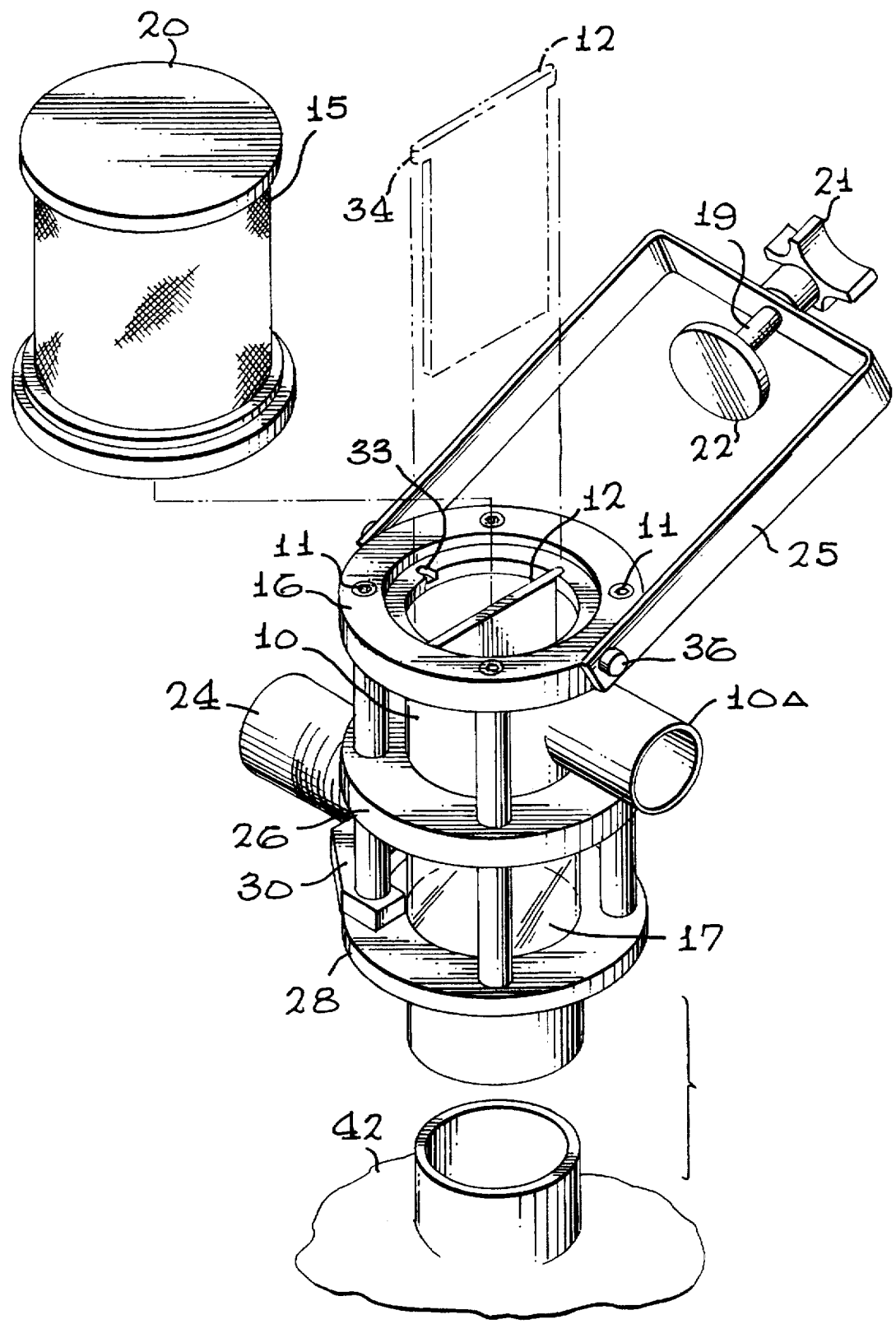

SMALL MATERIAL TRANSFER SYSTEM

This application claims the benefit of U.S. Provisional Application(s) No(s).: application Ser. No. 60/000,165 filing date Jun. 12, 1995.

BACKGROUND OF THE INVENTION

Material transfer systems for loading lightweight granular plastic material into injection molding or extruding machines have been known for many years. The flow of material to the loading device is controlled by a sensor which turns on or off a regulated source of compressed air feeding the material depending upon the level of material sensed in a sight glass. Recent improvements in such loading devices are described in our U.S. Pat. No. 5,252,008. Other patents showing similar types of material transfer systems are:

| U.S. Pat. No. 3,239,278 | Mueller et al. |
| U.S. Pat. No. 4,235,563 | Hine et al. |
| U.S. Pat. No. 4,411,388 | Muck |
| U.S. Pat. No. 4,599,016 | Medemblik |
| U.S. Pat. No. 4,812,086 | Kopernicky |
| U.S. Pat. No. 4,834,586 | Depew |

Recently, a need has developed for a material transfer device which is physically significantly smaller than similar devices presently in use. In particular there is a need for loading devices which are much shorter vertically, since current loading devices tend to be quite tall and add considerably to the height required to house and operate the associated injection molding or extrusion machines.

SUMMARY OF THE INVENTION

The inventors have designed a material transfer device particularly for handling granular plastic materials which are supplied to machines such as injection molding machines and the like, but which can also convey and load other lightweight granular materials and which is significantly reduced in size, particularly in height.

Material transfer devices of the type described typically include an input chamber to which the granular material is supplied, the material being carried in a stream of compressed air. The chamber includes a baffle or similar means for separating the air from the material. The inventors have been able to significantly reduce the height of the device by substituting a small tee chamber having a simple plate baffle for a comparatively tall conical hopper. A pleated paper filter and screen are secured to a plate above the tee chamber. When the material strikes the baffle, the material drops downwardly into a sight glass while the air, which also carries fines, is directed upwardly through the screen and filter. A middle plate is positioned between the tee chamber and the sight glass and O-ring seals prevent leakage between the tee chamber and the middle plate and between the sight glass and the middle plate. An end bell is similarly sealed to the lower end of the sight glass and incorporates a lower plate and a quick connect and disconnect fitting including an O-ring seal for attaching the device to the associated machine.

The top, middle, and lower plates are secured together with a plurality of support rods. A bracket carried on the lower plate and secured to two of the support rods carries a sensor which senses the level of material in the sight glass and controls the flow of compressed air to supply more material or to stop the flow as the level indicates.

In addition to the use of the small tee chamber instead of the usual large hopper, other features which have successfully reduced the height of the device include a shorter sight glass, a shorter end bell, and replacing of a quick disconnect coupling between the sight glass and the hopper with the middle or center plate.

BRIEF DESCRIPTION OF THE DRAWINGS

This invention may be more clearly understood with the following specification and by reference to the drawings in which:

FIG. 2 is a side elevational view of our material transfer system; and

FIG. 3 is a perspective view of the system of FIG. 2 with the filter element removed.

DETAILED DESCRIPTION OF THE INVENTION

Figure 1:
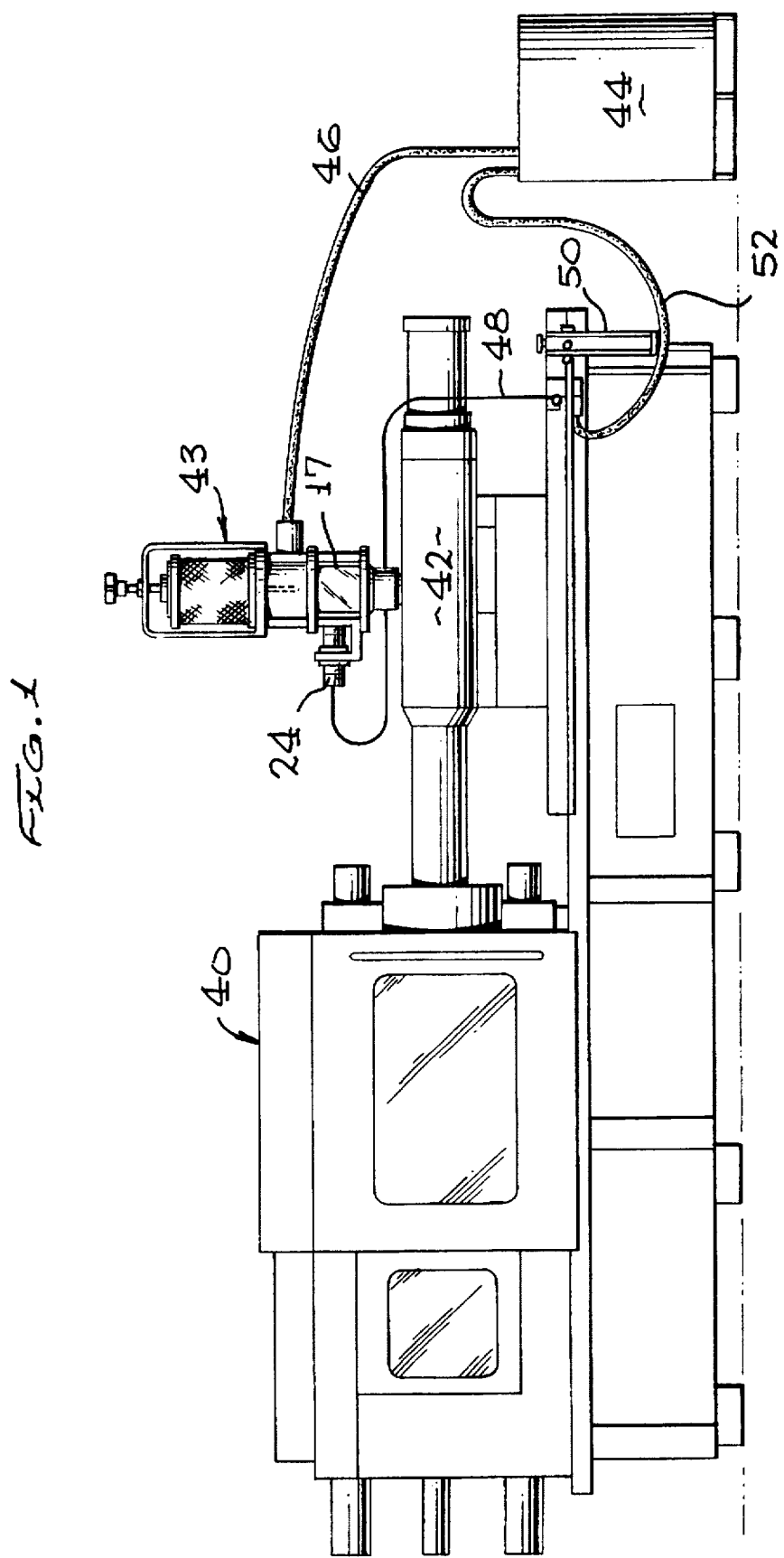
FIG. 1 is a front elevational view of an injection molding machine with our material transfer system.

Referring to FIG. 1, an injection molding machine is shown at numeral 40 having an input chamber or throat 42 for receiving a desired amount of granular plastic material for each cycle of its operation. Connected to the input chamber or throat 42 is a loading system 43 which receives material from a source 44 through a conduit 46. A sensor 24 is fastened to the side of the loading system 43 in such manner that it looks through a sight glass tube 17. The sensor 24 is connected through an insulated wire 48 to a control system including an air pressure regulator 50 which controls the supply of air to the source 44 for controlling the flow of material through conduit 46 to loading system 43. When the materials supplied reach a desired level in the reservoir sight glass 17, this is sensed by sensor 24 which sends a signal to the control system including the air pressure regulator 50 to shut off air supplied from an air hose 52 to the source 44. If no material is sensed in sight glass 17, the control system will continue to supply material to loading system 43.

Referring now to FIG. 2, the loading system of the invention is shown generally at numeral 43 and includes a tee section 10 including an inlet port 10A. Material from source 44 is supplied through conduit 46 to inlet port 10A and hence to the internal chamber in tee section 10. Within tee 10 is a baffle member 12, discussed below, which directs the granular material downwardly into the sight glass tube 17. Along with the material supplied to tee 10 is a substantial amount of air which flows upwardly through a screen 14 into a filter assembly, and from thence outwardly through a filter element 15 into the atmosphere. Certain fines and other solids are trapped on the inside of filter element 15. A top plate 16 serves as the base for the filter element which is secured on its top end by means of a lid 20 which is forced downwardly against the top of filter element 15 by means of a foot 22 engaged with a threaded rod 19 connected to a knob 21. Rod 19 is threadedly engaged with a nut secured to a handle 25 pivotally fastened at its lower end to the top plate 16 by means of screws 36. In this manner, it will be understood that the filter element 15 is easily removed and replaced by simply operating the knob 21 to relieve the pressure on lid 20 and rotating the handle 25 and foot 22 away from the top of the filter element 15.

Surrounding the tee member 10 are four support rods 18 which are secured to top plate 16 and also to a middle plate 26. Similar support rods 18 are connected to middle plate 26 and to a plate forming part of an end bell member 28. A bracket 30 secured to end bell member 28 provides a support for a sensor 24 whose function is to look through the sight glass tube 17 to determine the level of material in the sight glass and thereby to operate the control unit to cause more material to be supplied to loading system 42 or to shut off the flow of material. The end bell 28 is attached to the throat 42 of injection molding machine 40 by means of a quick disconnect coupling including an O-ring seal 32 which provides for easy and convenient removal of loading system 43 from machine 40 for cleaning, etc.

It will be observed that the top plate 16 serves as the base for the filter assembly and also includes notches 33 which receive tangs 34 on the top edges of the baffle plate 12 to support the baffle plate. Also located at the top of the plate 16 is filter screen 14 not shown on FIG. 3 but shown on FIG. 2. The filter element 15 sits on top of the top plate 16 and is secured in position by means of the handle 25 which is secured to the plate 16 by means of the screws 36. The threaded member 19 which is turned by knob 21 operates through the top of the handle to force the foot 22 down on top of the filter lid 20.

An O-ring 37 is inserted between tee 10 and the top plate 16 and a similar O-ring 38 is inserted between the bottom of tee 10 and the middle plate 26. The sight glass tube 17 is sealed to both of the middle plate 26 and the bottom end bell 28 by means of sealing rings 39 and 40.

FIG. 3 is a perspective view of most of the loading system 43 but with the filter element 15 displaced to show some internal structure. In this view is shown the end bell 28, the sight glass tube 17, the tee member 10, the middle plate 26, and the top plate 16, all of which are held together by threaded members 11 which are inserted into the centers of support rods 18. The handle 25 is shown tipped out of its normal operating position as it would be when the filter element is removed. The knob 21 turns the threaded rod 19 to either press foot member 22 down on top of the filter lid 20 to secure the filter in position or to release the filter lid 20 such that the filter element 15 can be removed. Positioned within the tee member 10 is baffle plate 12 which is also shown in dashed outline as separated from tee member 10.

A separate optional feature, not shown, is the inclusion of a pair of magnets which may be suspended from the middle plate 26 beside the sight glass tube 17 and which thereby attract and retain in sight glass tube 17 ferrous particles which it is desired to keep from entering the injection molding machine 40.

The above described embodiments of the present invention are merely descriptive of its principles and are not to be considered limiting. The scope of the present invention instead shall be determined from the scope of the following claims including their equivalents.

What is claimed is:

1. A loading device for a processing machine having an inlet chamber for receiving measured quantities of granular materials from a source of said materials;

said loading device comprising an inlet conduit connected to said source, a tee member having an internal chamber connected to said inlet conduit, a top plate secured to said tee member, a filter and a screen secured to said top plate in communication with said tee chamber, a middle plate connected to said tee member and a sight glass communicating with said tee chamber through said middle plate, a baffle in said tee chamber for directing said materials toward said sight glass, an end bell including a lower plate connected to said sight glass, an outlet conduit connecting said sight glass to said inlet chamber, a level sensor for sensing a level of said materials in said sight glass, and a plurality of support rods and threaded members securing said top plate to said middle plate and said middle plate to said lower plate.

2. A loading device as claimed in claim 1 wherein said end bell includes means for quickly connecting and disconnecting said loading device from said inlet chamber including a groove in said outlet conduit and a seal in said groove.

3. A loading device as claimed in claim 1 wherein said filter is a pleated paper filter element having top and bottom endcaps.

4. A loading device as claimed in claim 3 further comprising a handle pivotally secured to said top plate and clamp means connected to said handle for securing said filter element to said top plate.

5. A loading device as claimed in claim 4 wherein said clamp means includes a lid adjacent said filter element and manually operated threaded means for pressing said lid against said filter element.

6. A loading device as claimed in claim 1 wherein a bracket is secured to at least one of said support rods, and said level sensor is supported on said bracket.

7. A loading device as claimed in claim 1 further comprising seals interposed between said sight glass and said middle and lower plates.

8. In a material transfer system for a processing machine having an input chamber for receiving measured quantities of granular materials from a source of said materials, a loading device mounted on said machine including an inlet conduit, a source of air under pressure for causing said materials to flow from said source to said inlet conduit, and control means for controlling said air pressure source;

said loading device further comprising a tee member having an internal chamber connected to said inlet conduit, a top plate connected to said internal chamber, a filter and a screen mounted on said top plate in communication with said internal chamber including means for securing said filter in sealing engagement with said top plate, a middle plate connected to said tee member communicating with said internal chamber, a reservoir connected to said middle plate and communicating with said internal chamber including a sight glass and a level sensor an internal baffle in said internal chamber for deflecting said materials toward said reservoir, said internal chamber further including an internal passage communicating with said filter, an end bell including an outlet conduit connecting said reservoir to said input chamber, a lower plate connected to said sight glass, means for quickly connecting and disconnecting said loading device from said input chamber including a groove in said outlet conduit and a seal in said groove, and a plurality of support rods and threaded members securing said top plate to said middle plate and said middle plate to said lower plate.

9. A loading device as claimed in claim 8 wherein a bracket is secured to at least one of said support rods, and said level sensor is supported on said bracket.

10. A loading device as claimed in claim 8 further comprising seals interposed between said sight glass and said middle and lower plates.

11. A loading device as claimed in claim 8 wherein said filter is a pleated paper filter element having top and bottom endcaps.

12. A loading device as claimed in claim 11 wherein said for securing said filter means includes a handle pivotally secured to said top plate and clamp means on said handle for securing said filter element to said top plate.

13. A loading device as claimed in claim 12 wherein said clamp means includes a filter lid closing said top endcap, and a manually operated threaded rod for pressing said filter lid against said filter.

14. A loading device for a processing machine having an inlet chamber for receiving measured quantities of granular materials from a source of said materials, said materials being supplied from said source in a stream of compressed air;

said loading device comprising an inlet conduit connected to said source, a tee member having an internal chamber connected to said inlet conduit, a top plate secured to said internal chamber, a filter, means securing said filter to said top plate in communication with said internal chamber including a handle pivotally secured to said top plate and clamp means fastened to said handle, a second plate and a reservoir assembly secured to said second plate in communication with said internal chamber, a baffle in said internal chamber positioned such that said materials from said inlet conduit impinge against said baffle and are directed to said reservoir assembly, said reservoir assembly including a sight glass and a level sensor for sensing a level of said materials in said sight glass, and an end bell including an outlet conduit connecting said sight glass to said inlet chamber, a groove in said outlet conduit, and a seal in said groove.

15. A loading device as claimed in claim 14 wherein said end bell further includes a bottom plate and said loading device further comprises a plurality of support rods and threaded members securing said top plate to said second plate and said second plate to said bottom plate.

16. A loading device as claimed in claim 14 wherein said filter is a pleated paper filter element having top and bottom endcaps.

17. A loading device as claimed in claim 14 wherein said stream of compressed air with said materials is directed against said baffle causing said materials to be directed to said reservoir assembly and said compressed air to said filter.

* * * * *